United States Patent [19]
Engelhardt

[11] 3,802,117
[45] Apr. 9, 1974

[54] TETHERED FLYING DISC
[76] Inventor: Eugene W. Engelhardt, 2060 State Ave., Costa Mesa, Calif. 92627
[22] Filed: Oct. 14, 1971
[21] Appl. No.: 189,143

[52] U.S. Cl............................ 46/61, 46/64, 46/74 D
[51] Int. Cl................................................ A63h 27/12
[58] Field of Search ........... 46/60, 61, 64, 67, 74 D, 46/77, 74 R, 83; 273/99, 97 R

[56] References Cited
UNITED STATES PATENTS

| | | |
|---|---|---|
| 2,166,115 | 7/1939 | Bergenn .......................... 273/97 R |
| 3,295,251 | 1/1967 | Tomasello .......................... 46/61 |
| 1,784,179 | 12/1930 | Coles .......................... 46/61 |
| 2,010,156 | 8/1935 | Jimerson .......................... 46/64 |
| 3,082,574 | 3/1963 | Hellman .......................... 46/67 X |
| 2,624,153 | 1/1953 | Johnson et al. .......................... 46/83 |

Primary Examiner—Louis G. Mancene
Assistant Examiner—Robert F. Cutting

[57] ABSTRACT

A tethered flying disc in which a concave disc or airfoil has a reel extending axially downwardly from its underside, and a line is connected between the reel and a casting wand.

5 Claims, 2 Drawing Figures

PATENTED APR 9 1974 3,802,117

INVENTOR
EUGENE W. ENGLEHARDT

TETHERED FLYING DISC

BACKGROUND OF THE INVENTION

Concave-convex discs or airfoils have become a popular play device. Such discs are manually cast with a spinning action whereby the gyroscopic effect maintains balance and the airfoil effect provides lift, so that the disc, with practice, may be caused to fly for substantial periods of time and cover a substantial distance.

Unless a partner is available to fly the disc on a return flight, a user, in general, is required to chase the disc to its landing site to recover it for further flight.

Thus, to increase the utilization of such flying discs and provide additional pleasure to users there has been a need for means for modifying the manner of use and enabling recovery after flights, as well as to require skill in operation.

SUMMARY OF THE INVENTION

The present invention provides a flying disc toy or amusement device adapted to utilize the gyroscopic and lift effects of the disc in flight, but wherein the disc has a reel portion with a line connected to the reel portion whereby the disc may be cast to cause flight in one direction away from a user, the line unwinding from the reel portion, and then retrieved in flight, the line rewinding on the reel portion. Such an arrangement is such that, with practice, the user may retrieve the in flight disc and, without interrupting flight recast the disc in another direction.

In accomplishing the foregoing, the invention provides beneath the usual concave-convex disc a spool or reel portion coaxial with the disc and from and on which the line is adapted to be unwound and wound during flight. The reel portion is spaced axially downwardly from the lower, outer peripheral edge of the disc as to not interfere or produce drag or deflecting forces on the disc during normal attitudes of flight upwardly and away from one casting the disc and downwardly and towards the caster.

In addition, inasmuch as the restraint applied to the reel by the line during unwinding and winding has a tendency to cause the disc to precess or be moved from its natural spin axis, the device may be so constructed that the reel portion is located more or less at the center of gravity of the disc and reel combination so as to minimize the precession resulting from the forces applied by the line to the reel portion. In accomplishing this, a weight may be provided beneath the reel portion of the device to lower the center of gravity, such weight also providing a depending stem for engagement with the ground at the end of a flight.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

DESCRIPTION OF THE PREFERRED EMBODIMENT

Figure 1:
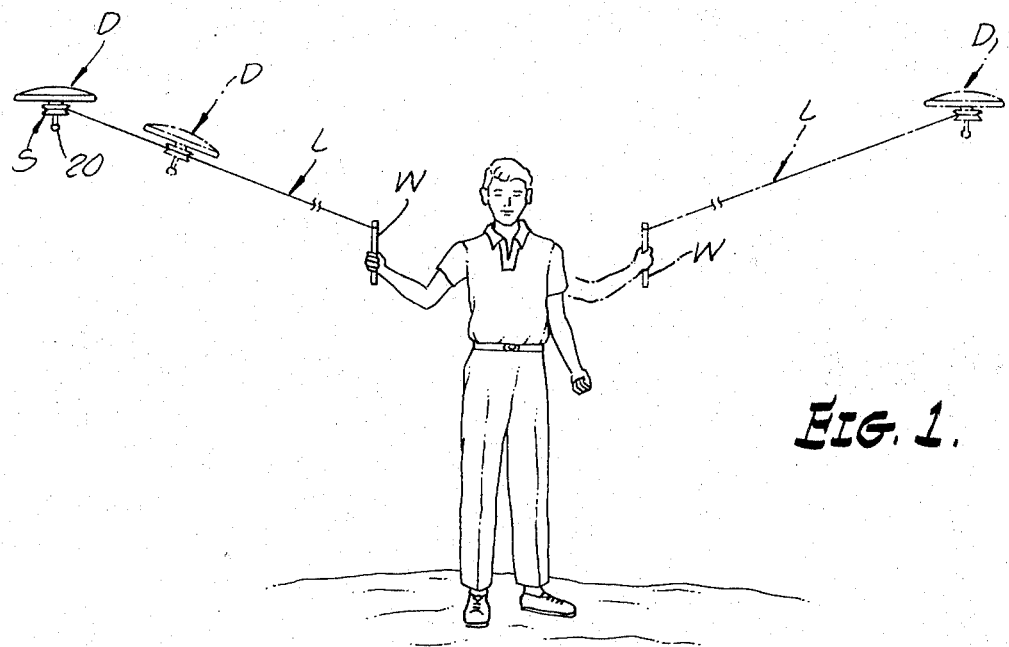
FIG. 1 is a view generally illustrating a tethered flying disc embodying the invention, as used.

As seen in the drawing, the invention comprises a concave-convex disc D beneath which is a spool portion S on and from which a line L is adapted to wind and unwind, the line being attached to a casting wand W adapted to be manipulated by a person using the device, so that as seen in FIG. 1, the device may be cast or flown outwardly in one direction, as seen in full lines, will return, and may, without interruption in flight, be cast or flown outwardly in another direction, as generally illustrated in broken lines, an intermediate disposition of the device during outward flight also being shown in broken lines.

Figure 2:
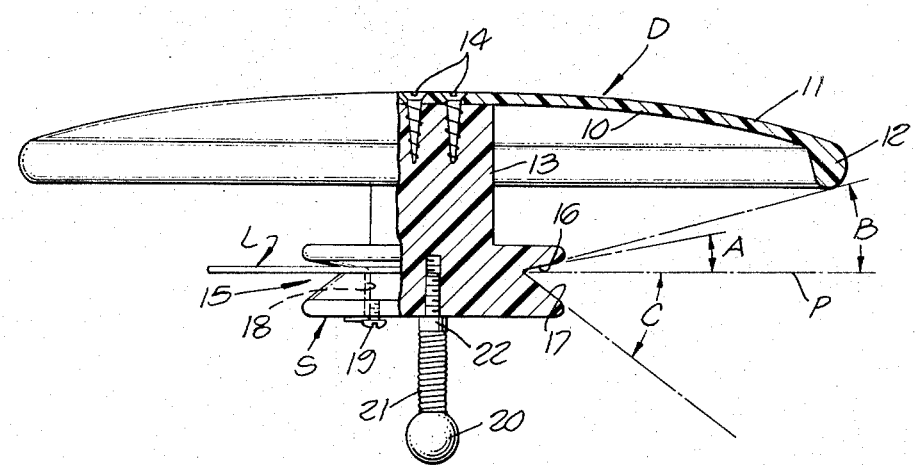
FIG. 2 is a view partly side elevation and partly in vertical section showing the details of the device.

Referring to FIG. 2, it will be noted that the disc D in its preferred form, is concave-convex, having an undersurface 10 which is concave and an upper surface 11 which is convex, and is bordered by an outer peripheral rim 12 depending downwardly, so that all radial sections of the disc are of typical airfoil form. Such discs, per se, are well known and may be cast or flown from substantial distances and periods depending upon the ability of the user to produce casting spin and proper angle of attack to avail of the combined gyroscopic and lift effects of the disc.

The disc D, according to the present invention, is provided with the reel portion S. This spool portion is formed on or otherwise made a part of a stem or support 13 which depends coaxially downward from the undersurface 10. In the illustrated embodiment, the stem 13 is affixed to the disc D by suitable fasteners 14, and, hence, with the stem detached, the disc D may be enjoyed in the usual manner. However, it will be understood that for economy of manufacture, the disc D and stem 13 with its reel portion S may be formed as a unit, say from molded plastic.

The spool portion S has an outwardly opening line accommodating, generally V-shaped, groove 15 defined by an upper wall 16 extending at an angle A relative to a plane P normal to the axis of the reel and intersecting the base of the V-shaped groove which is smaller than the angle B defined between said plane P and the lower edge of the disc rim 12, so that the outer periphery of the wall 16 will contact the line L during flight of the disc D before the disc can assume an angle at which the line can contact the outer lower edge of the disc D, to provide a force tending to inhibit the build up of the angle of attack, as will be later described. In addition, the lower wall 17 of the groove defines an angle C with the plane P larger than the angle between said plane and the line L during normal flight altitudes so that the outer edge of the wall 17 will not interfere with the line L during nomal flight, as will be later described.

The line L is connected to the reel portion S at the base of the groove 15, in any suitable manner, but in the illustrated embodiment, the line L extends through an opening 18 leading from beneath the reel portion S and opening at the apex of the groove, and the line is affixed in the opening by a screw 19. Of course, the end of the line may be knotted or otherwise connected to the reel S.

Within practical limits as required by the angles B and C, the spool portion S is located closely beneath the disc D to minimize the deflecting forces applied to the spool S tending to impose an angular force on the axis of the spinning disc D while it is in flight, which force has a tendency to move the spin axis and interfere with the desired attitude of the disc during flight, resulting in the disc assuming excessive angle of attack in one direction or negative angle of attack in the other direction.

In the illustrated embodiment, the tendency of the angular force applied by the line L to tilt the spin axis of the device is minimized by lowering the center of gravity of the device. While various means may be employed for lowering the center of gravity of the device more or less to the vicinity of the plane P, I prefere to employ a depending weight 20 and a tight weight supporting coil spring 21 affixed at the axis of the reel portion S by fastener 22, so that the weight and spring also function as shock absorber means with the ground when the disc lands, such shock absorber means assisting in protecting the device against damage.

In the use of the device, as seen in FIG. 1, the user casts the device outwardly, say to the full line position, so that it flys to the extreme outer position as permitted by the line L, unwinding the line L from the spool portion S. The line preferably has a length on the order of fifteen or more feet, the ultimate length being a practical consideration of maintaining adequate inertia to maintain flight during alteration of the direction of flight and rewinding of the line during the return flight. The disc D should assume an attitude in the intermediate stages of outward flight, as shown in broken lines and by the arrow, so that the angle of attack is positive, but at the outer extreme of flight the spin axis will change sufficiently as shown in full lines, that the return flight downwardly and towards the user is also positive. Thus, the angle B should be great enough to prevent contact of the line with the disc rim 12 during the outward flight, and the angle C should be great enough to prevent contact of the line with the outer edge of the wall 17 of the groove 15. The general V-shape of the groove 15, however, tends to guide the line L substantially to the general region of the plane P to minimize the shift in the location at which the line applies resistance to the flight of the device relative to its center of gravity, which would tend to vary the angle of attack of the device.

From the foregoing, it will be apparent that the present invention provides a toy or amusement device requiring a certain degree of skill and understanding of flight for most effective use, and which will afford amusement and pleasure for the user.

I claim:

1. In a tethered flying disc device, a disc having means for producing gyroscopic and lift effects when cast in the air with a spinning action, including a convex upper surface, a reel portion, said reel portion having a stem coaxial with said disc, said stem being integrated with said disc, with said reel portion disposed below said disc for accommodating a line to be unwound and wound on said reel portion, and a line secured at one end on said reel portion.

2. In a tethered flying disc device as defined in claim 1, said reel portion having a stem depending from the undersurface of said disc, and a weight beneath said reel portion whereby the center of gravity of the device is adjusted downwardly.

3. In a tethered flying disc device as defined in claim 1, said reel portion having a stem depending from the undersurface of said disc, and shock absorber means beneath said reel portion providing a weight whereby the center of gravity of the device is adjusted downwardly.

4. In a tethered flying disc device as defined in claim 1, said reel portion having means for preventing said line from dragging on said reel as said disc is cast at a positive angle of attack and during normal flight attitudes.

5. In a tethered flying disc device as defined in claim 1, said reel portion having means for preventing said line from dragging on said reel as said disc is cast at a positive angle of attack and during normal flight attitudes including a V-shaped groove defined by an upper wall extending at an angle relative to a plane normal to the axis of the reel and intersecting the base of the V-shaped groove which is smaller than the angle defined between said plane and the lower edge of the disc at its outer periphery and a lower wall which defines an angle relative to said plane larger than the angle between said plane and the line during normal flight attitudes.

* * * * *